UNITED STATES PATENT OFFICE.

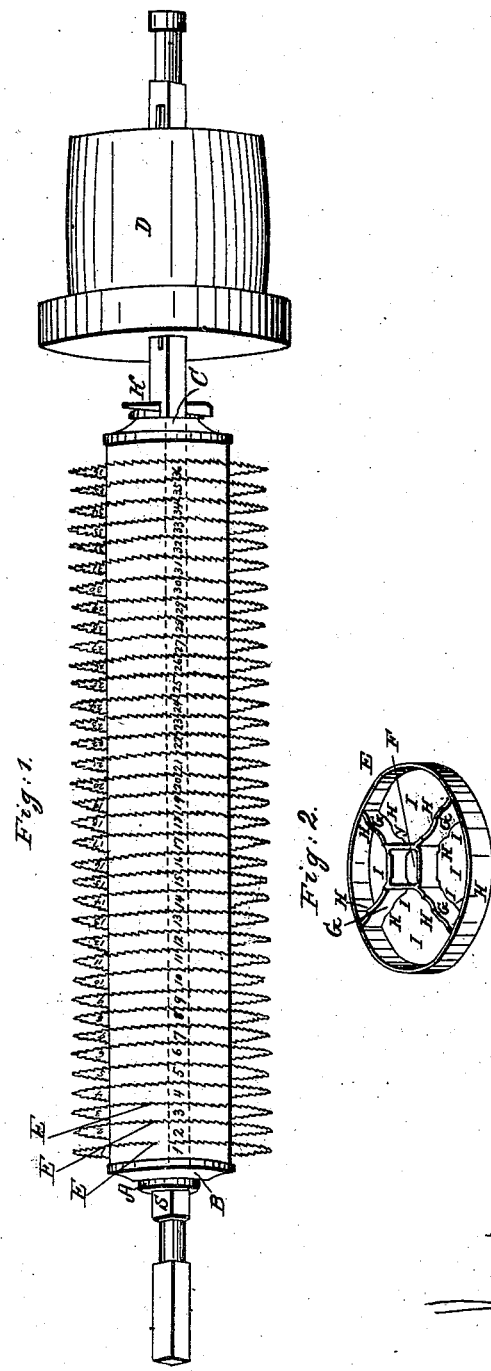

JACOB IDLER, OF PHILADELPHIA, PENNSYLVANIA.

IMPROVEMENT IN MODE OF CONSTRUCTING SAW-CYLINDERS FOR COTTON-GINS.

Specification forming part of Letters Patent No. 498, dated December 1, 1837.

*To all whom it may concern:*

Be it known that I, JACOB IDLER, of the city and county of Philadelphia, and State of Pennsylvania, have invented a new and useful Improvement in the Construction of the Saw-Cylinder for Cotton-Gins, which is described as follows, reference being had to the annexed drawings of the same, making part of this specification.

This cylinder is made of metal in sections, between which the saws are placed parallel to each other and at right angles to the shaft, which passes through the center of the whole. Each section of the cylinder consists of a cylindrical ring, E, Figs. 1 and 2, smooth on the periphery and edges, united to a round, square, or polygonally shaped socket, F, Fig. 2, through which the shaft of a corresponding shape passes by arms G, having projections or bearings H on their sides, as well as on the ends of the sockets, for sustaining the circular saw placed between every pair of these rings, the spaces I, between the arms and the bearings of the arms and of the pockets, allowing room for the lateral spread of such parts of the saw-plate as are swelled or extended, caused by what is termed "buckling," and by this means causing the parts of the saw-plate beyond the periphery of the cylinder, or those parts which act between the comb of the cotton-gin, to acquire a straight and even surface, which cannot be done by the use of solid sections, as are commonly used.

The gin-saws are secured on an iron shaft, S, Fig. 1, of a proper length for a cotton-gin, in the following manner: On the left side, on said shaft, as you look at the drawings, about one and three-fourths inch from the journal, a strong collar, A, is welded, against which a circular iron plate, B, is fastened. Said plate is about four inches less in diameter than the saws. The inside is turned perfectly true. Against this plate is brought a round wheel or pulley, E, of the same diameter, made of iron, brass, or other metal, seven-eighths of an inch in width, (which is the space generally approved of between the saws,) more or less, if desired. Said wheel is marked N'. Against this wheel N' is placed the first saw, N'. After that follows the section $N^2$, of the same diameter and thickness. Then follows a saw, $N^2$. Next, section 3; then again a saw, $N^3$, and so it continues till the shaft for fifty saws (more or less) is full, and when all the saws and the wheels between them are on the shaft. Then comes the outside plate or shutter, C, which is forced against the saws and circular metallic sections by a screw or key, K, which forces them close and tight, so that the saws cannot vary the least from their true positions. They will of course then revolve in true lines and be compelled to pass in a true line in or between the small spaces of the iron or steel gin-ribs on a cotton-gin.

The saws not being able to vary is one of the great excellences of this gin. Gin-saws which are thus securely confined and compelled to pass through the center of the space between the gin-ribs, when they pass along with the cotton between said ribs without interfering with them, are not liable to cut or hurt the cotton or force it into the teeth, which has heretofore caused the many little knots in the cotton so vexatious to spinners. When the saws cannot vary they will clean more than is ordinarily done, and deliver the cotton unhurt; but when the saws are fastened in wood or wooden cylinders, which has been the practice heretofore, the saws are liable to vary, some passing too near the gin-ribs, others rubbing and crowding against them, which cuts and hurts the cotton and causes the little motes or knots therein. If the shaft of the metallic cylinder is square, the holes in the sections are to be square, and if the shaft is round, with a feather or groove on it to prevent the saws and wheels from turning, the aperture in the saws or sections is made to fit it. Near the end of said shaft is the driving-pulley D, by which the cylinder is set in motion.

Among the advantages gained by this metallic saw-cylinder is that as soon as the saws become dull, by unscrewing or unkeying the iron cap or shutter c the saws can be easily taken off and sharpened, and put to their former places by having each saw and section numbered, and by the two guide-lines on the cylinder. This process can be renewed until the saws are worn out.

The invention claimed by me, the said JACOB IDLER, and which I desire to secure by Letters Patent, consists in—

Forming the cylinder of the saw cotton-gin with hollow cylindrical metallic sections, with projections or bearings on the sides of the arms and ends of the sockets of said sections for sustaining, in conjunction with the sides of the rings or sections, the circular saw-plate in a firm and true position on the shaft, and parallel with each other, the spaces formed between the arms and bearings allowing room for the swellings or bucklings of the saws, so that the part of each saw-plate outside the cylinder which runs between the gin-ribs or comb shall always be true and even.

JACOB IDLER.

Witnesses:
WM. P. ELLIOT,
W. BISHOP.